(12) United States Patent
Geva et al.

(10) Patent No.: US 9,773,472 B2
(45) Date of Patent: *Sep. 26, 2017

(54) TEXT EXTRACTION FROM GRAPHICAL USER INTERFACE CONTENT

(71) Applicant: International Business Machines Corporation, Armonk, NY (US)

(72) Inventors: Amir Geva, Yokneam (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,928

(22) Filed: Aug. 3, 2016

(65) Prior Publication Data

US 2016/0342833 A1    Nov. 24, 2016

Related U.S. Application Data

(63) Continuation of application No. 13/872,172, filed on Apr. 29, 2013, now Pat. No. 9,520,102.

(51) Int. Cl.
| | |
|---|---|
| *H04N 1/40* | (2006.01) |
| *G09G 5/02* | (2006.01) |
| *G06K 9/00* | (2006.01) |
| *G06K 9/34* | (2006.01) |

(52) U.S. Cl.
CPC .......... *G09G 5/02* (2013.01); *G06K 9/00456* (2013.01); *G06K 9/342* (2013.01); *H04N 1/40012* (2013.01); *H04N 1/40062* (2013.01); *G06K 2209/03* (2013.01)

(58) Field of Classification Search
None
See application file for complete search history.

(56) References Cited

U.S. PATENT DOCUMENTS

| | | | |
|---|---|---|---|
| 6,301,386 B1 | 10/2001 | Zhu et al. | |
| 6,519,362 B1 * | 2/2003 | Cusmariu | G06K 9/00456 358/464 |
| 7,046,390 B2 * | 5/2006 | Atkins | G06T 3/403 358/1.2 |
| 7,085,420 B2 | 8/2006 | Mehrotra | |
| 7,567,709 B2 | 7/2009 | Lim et al. | |
| 7,840,071 B2 | 11/2010 | Tang et al. | |

(Continued)

OTHER PUBLICATIONS

Lin Tony, "Compound Image Compression for Real-Time Computer Screen Image Transmission", IEEE Transactions on Image Processing, vol. 14, Issue 8, pp. 993-1005, Aug. 2005.

(Continued)

*Primary Examiner* — Barry Drennan
*Assistant Examiner* — Terrell Robinson
(74) *Attorney, Agent, or Firm* — Ziu Glazberg

(57) ABSTRACT

Systems and methods for extracting text from images rendered on a display screen, the method comprising capturing a color image rendered on a display screen; and transforming the color image to binary color image, preserving text-like graphic components and filtering out non-text-like graphical components. The transforming comprises scanning one or more areas of the color image; and detecting continuous bi-tonal regions in the scanned one or more areas, wherein the continuous bi-tonal regions have large variances.

18 Claims, 9 Drawing Sheets

(56) References Cited

U.S. PATENT DOCUMENTS

| | | | |
|---|---|---|---|
| 8,000,535 B2* | 8/2011 | Speigle | G06K 9/346 358/462 |
| 2002/0006220 A1* | 1/2002 | Kohchi | G06K 9/00456 382/165 |
| 2009/0285444 A1 | 11/2009 | Erol et al. | |
| 2009/0297024 A1* | 12/2009 | Dai | G06K 9/00456 382/165 |
| 2012/0134581 A1 | 5/2012 | Matsuda | |
| 2012/0155754 A1* | 6/2012 | Chen | G06K 9/00456 382/164 |

OTHER PUBLICATIONS

Shivananda et al., "Separation of Foreground Text From Complex Background in Color Document Images", Seventh International Conference on Advances in Pattern Recognition, pp. 306-309, 2009.

Jagannath et al., "Lossless Compression of a Desktop Image for Transmission", International Journal of Recent Trends in Engineering, vol. 2, No. 3, Nov. 2009.

Saluja et al., "Text Extraction and Non Text Removal From Colored Images", International Journal of Computer Applications, vol. 44, No. 22, Apr. 2012.

* cited by examiner

The Open Button

You can open your Mail ☺, Calendar ☺, Contacts ☺ and the new Symphony ☺ from the Open list. Click the Open button to see the list.

*FIG. 3D*

TEXT EXTRACTION FROM GRAPHICAL USER INTERFACE CONTENT

CROSS-REFERENCE TO RELATED APPLICATIONS

This application is a continuation and claims the benefit of U.S. non-provisional application Ser. No. 13/872,172 filed Apr. 29, 2013, which is hereby incorporated by reference in its entirety.

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to graphical user interfaces in a computing environment and, more particularly, to recognizing and extracting text from a graphical user interface content.

BACKGROUND

Currently there are no efficient solutions for extracting text from graphical user interface (GUI) content rendered on a display screen of a computing system. The related solutions are either not accurate enough for typical optical character recognition (OCR) schemes or produce ambiguous results. Without going into much detail, the disambiguation of the produced results can be prohibitively resource intensive, particularly for real time applications.

OCR methods are currently available that can be applied to a gray scale image and reduce the image to a binary format by calculating the maximally separating threshold between two assumed modals in a gray scale histogram of the image. If such methods are applied to GUI content displayed on a screen, such as that shown in GUI environment 110 of FIG. 1, an output such as that shown in FIG. 2A may be produced, using once a global threshold and once an adaptive threshold.

As shown in FIG. 2A, text regions in the example illustration are indeed separated, but artifacts introduced by the OCR algorithm are also visible in the background. Using a global threshold can cause parts of gradients in the background to merge with the text foreground. Referring to FIG. 2B, when the adaptive threshold is used, the text is segmented, but again due to the gradient, the resulting image is cluttered with foreground objects. Methods than can produce better results are desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, systems and methods for extracting text from images rendered on a display screen are provided. The method comprises capturing a color image rendered on a display screen; and transforming the color image to binary color image, preserving text-like graphic components and filtering out non-text-like graphical components. The transforming comprises scanning one or more areas of the color image; and detecting continuous bi-tonal regions in the scanned one or more areas, wherein the continuous bi-tonal regions have large variances.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIG. 3D is an illustration of exemplary results generated from applying the segmentation process to the GUI content, in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
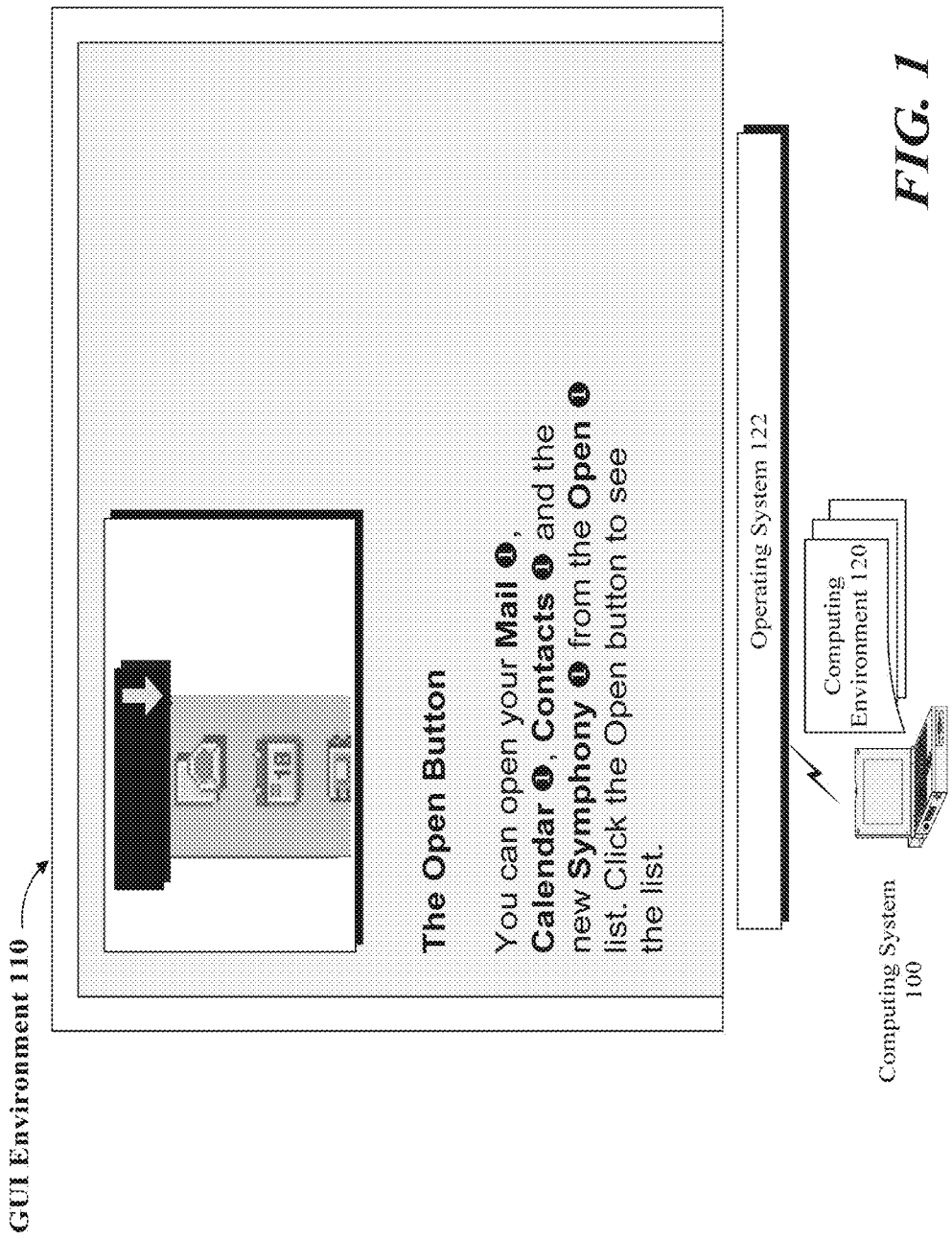
FIG. 1 illustrates an exemplary graphical user interface (GUI) environment, in accordance with one or more embodiments, wherein a segmentation scheme may be applied to extract text from GUI content.
Figure 2A:
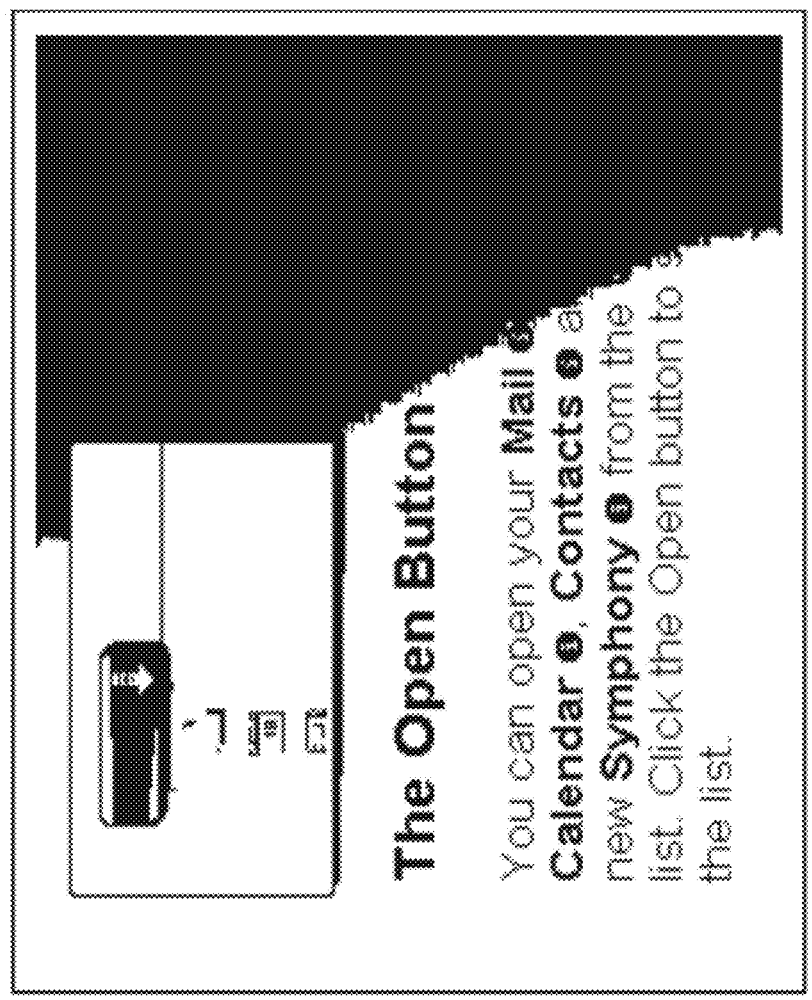
FIGS. 2A and 2B are exemplary results of applying an algorithm to reduce a gray scale image to a binary image.
Figure 2B:
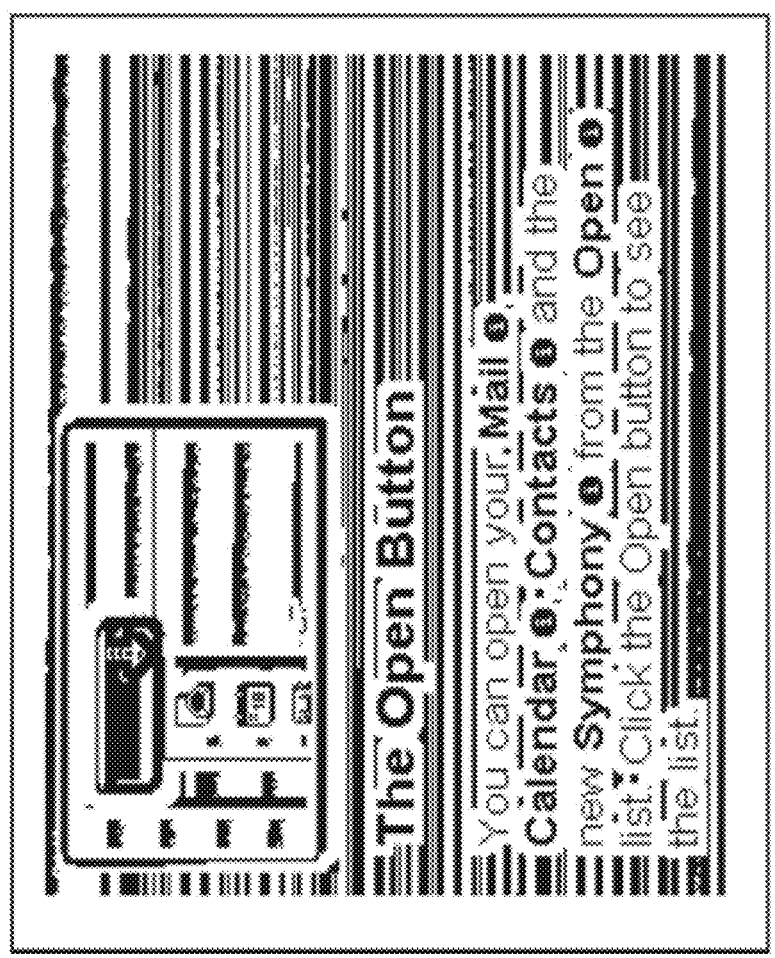

Referring to FIG. 1, an exemplary graphical user interface (GUI) environment 110 is illustrated, wherein a computing system 100 supports the execution of an operating system 122 in a computing environment 120. As shown, GUI environment 110 may be rendered on a display screen of computing system 100. The GUI environment 110 may comprise GUI content that includes text and non-text elements (e.g., graphics) that overlap. An example image of GUI content is illustrated in FIG. 1. It would be desirable to extract the text elements from the non-text elements in an efficient manner.

In accordance with on embodiment, a method for compressing GUI content (e.g., images) is provided in which the GUI content is transformed from color to black and white. In the following the image transformation process is sometimes referred to as bilevel segmentation or bilevelization and is utilized to preserve the textual content of the image, using minimal computational resources. A composite image of the output of the bilevel segmentation process together with a sparse representation of the background graphics may be produced to preserve the context of the foreground the text.

In one example embodiment, the transforming of the GUI content comprises representing a set having components that are thinnest on average from one or more bi-tonal regions and extracting that component as the text component. The components are generally thinner than non-text components may be recognized based on switches between runs where the single color part (e.g., black in case of a black and white text) is very thin (e.g., if measure in the number of pixels). For example, if the single color part of a run is one pixel each time, then that part of the run is recognized as the thinnest component. Depending on implementation, non-text components may have less likelihood of having very thin components during a run.

The bilevelization process, in one embodiment, may be implemented based on an observation that on a regular screen, the border area in textual elements in a vast majority of cases includes two colors. That is, there is a first color defining the foreground color attributed to the text; and there is a second color defining the background color attributed to the area surrounding the text. The above observation may be used advantageously to implement a process to extract the text from the background, as provided in further detail below.

Figure 3A:
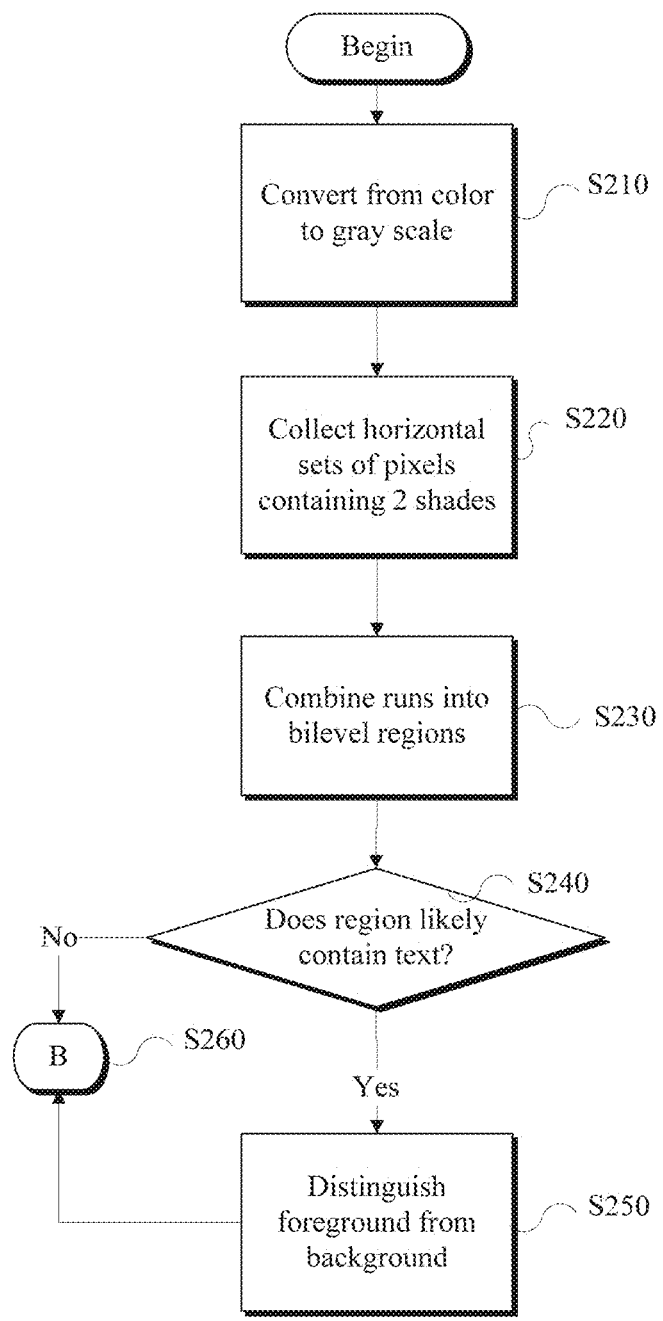
FIG. 3A is a flow diagram of a method for distinguishing text in a GUI content, in accordance with one embodiment.

Referring to FIG. 3A, the target GUI content may be first converted into gray scale (S210), thus creating an image that comprises gray scale intensities (i.e., shades of gray) as opposed to a plurality of colors. The above conversion process is particularly feasible where the text content uses intensity-based contrast in addition to color. Once the gray scale image is produced, horizontal consecutive sets of pixels (i.e., runs) that contain two distinguishable shades of gray are collected (S220).

Figure 3B:
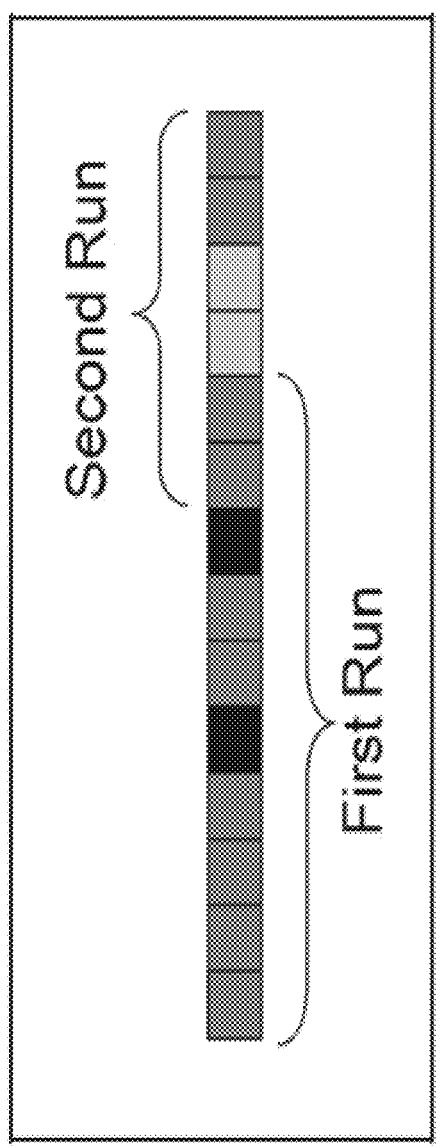
FIG. 3B is a diagram illustrating a collection of pixels during a scan of a target GUI content, in accordance with one embodiment.

As shown in FIG. 3B, the so-called runs may overlap one another, as the last shade of gray in a certain run is the first shade of gray for the next run. In one implementation, equivalent classes may be used to combine runs into bilevel (optionally rectangular) regions (S230). Equivalence classes refer to data structures or data containers that group elements in the classes according to some user defined predicate (e.g., runs that are parallel, containing the same two colors, where the vertical coordinate differs by one).

It may be determined if a bilevel region may be classified as containing text (S240). If a region is determined to include text, a second classification may be also associated with that region to distinguish which of the two shades of gray in the run represents the foreground (i.e., text) and which represents the background (S250). Otherwise, the process continues to analyze the remaining runs and bilevel regions.

Referring to FIG. 3B, the runs in a target GUI content may be collected by a row scan traversal of one or more areas of the content. In a run, the position in which the pixel intensity (i.e., shade of gray) changes is called a switch. A switch may either be part of a current run (if the new intensity is one of the acquired two shades), or the end of the current run (if two other shades are already defined for the current run).

It is noteworthy that in one implementation, if the current run ends, the new run starts not from the current position of the scan, but from the position of the last switch, thus providing the overlap between two adjacent runs. During the scanning process, additional information may be collected to help determine how foreground and background pixels may be distinguished at a later stage of the bilevelization. Such information may include the number of switches detected in a run and the distance between two adjacent switches.

The runs may be combined into bilevel regions by using an equivalence class algorithm, employing a custom equivalence predicate that states that two runs are equivalent if they conform to three conditions:

(1) they overlap (at least partially) in the X axis such that
    $\max(r1.\text{start}, r2.\text{start}) < \min(r1.\text{stop}, r2.\text{stop})$;
(2) they are one scan line apart vertically such that
    $|r1.y - r2.y| = 1$; and
(3) they have the same two color intensities.

In one implementation, a bilevel region and the additional information collected during the earlier processes are utilized to classify the region as either text or non-text. This classification may be done by simple heuristics on the statistics of the switches. Text bilevel regions may have a large number of switches, whereas non-text areas may not. The text color classification may be performed by examining the statistics of the length of runs of each shade of gray. Advantageously, when the text is surrounded by background pixels, the classification may be performed very efficiently and accurately.

Figure 3C:
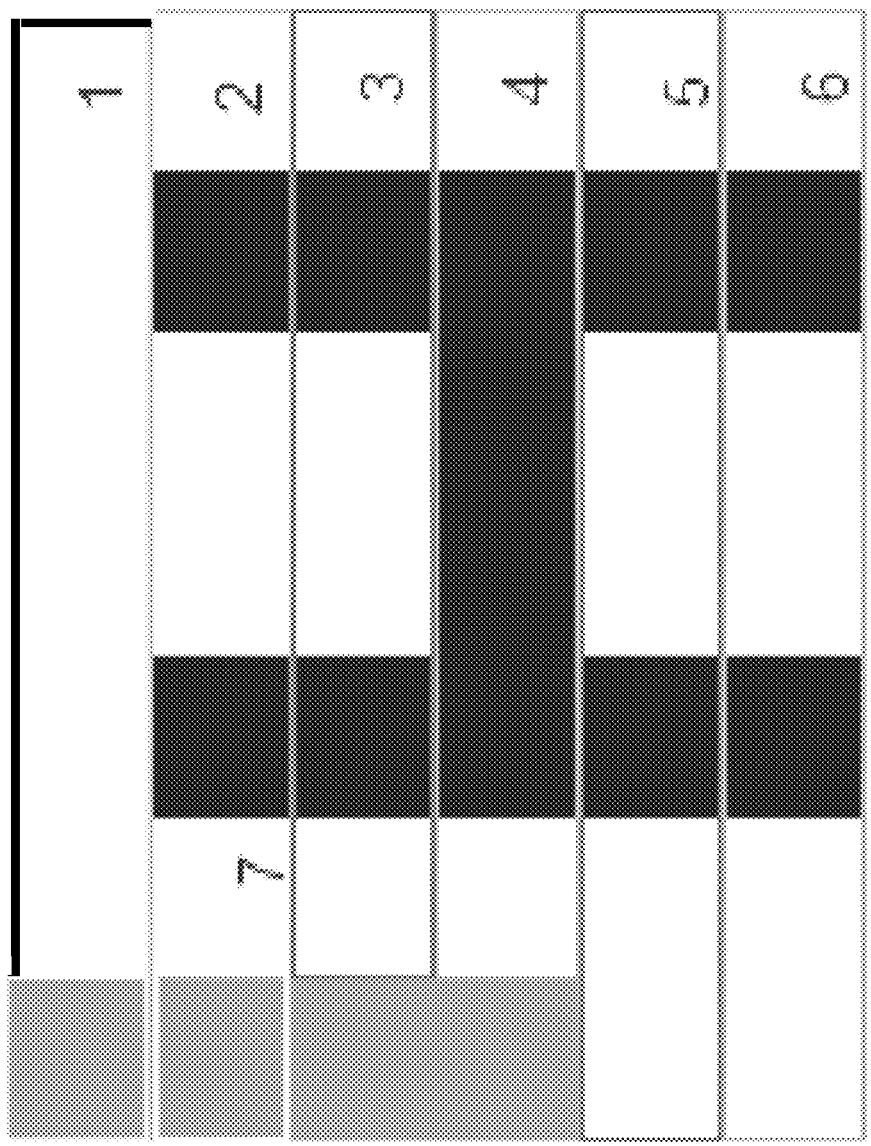
FIG. 3C is a diagram illustrating an example of equivalence classes, in accordance with one embodiment.

FIG. 3C is a diagram illustrating an example of equivalence classes, in accordance with one embodiment. As shown in this example, there are seven runs, where the number marked on the right side of the run indicates the order in which the runs are executed. Run numbers 1 and 7 cover pixels that are gray and white, for example. Runs 2 through 6 cover pixels that are black and white, for example. The equivalence class algorithm would take the list of 7 runs and split them into 2 groups, according to position and color: (1,7) and (2,3,4,5,6).

A condition may be set that two runs are considered equivalent, if for example: the runs overlap on the X axis, the runs are, for example, one line apart and have the same two colors. As shown, runs (1,7) meet said conditions and are thus considered equivalent. Runs (1, 2) do not share the same colors, but they do conform to the other criteria. The power of the equivalence class is that the equivalent is transitive. Once the following pairs (2,3), (3,4), (4,5), (5,6) are marked as equivalent, any two of the pairs are considered equivalent, and are thus in the same group.

FIG. 3D is an example illustration of the results of applying the bilevel segmentation process to the GUI content shown in FIG. 1. It is noteworthy that in the present disclosure example embodiments are disclosed as using the gray scale mode for reducing the complexity of the problem being solved. In other embodiments, the use of gray scale is not mandatory. In other words, the concepts and processes disclosed here may be applied to content that are in any color provided that rows of pixels may be selected according to the bilevelization scheme disclosed above.

Furthermore, in certain implementations, bilevelization may not be limited to scanning the pixels in runs that include two colors or two intensities. In other words, in certain embodiments, instead of bilevel segmentation, multilevel segmentation may be applied to recognize multilevel regions that may be analyzed to determine whether such regions contain text in a manner similar to that disclosed above.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
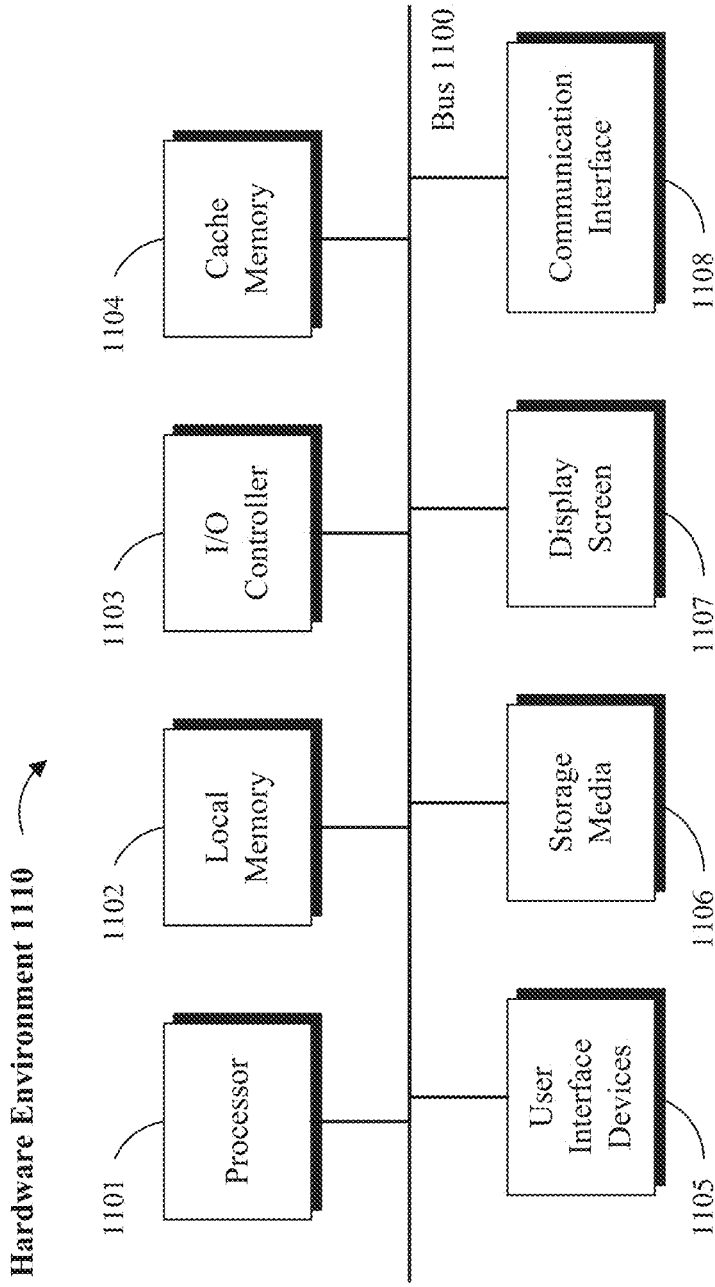
FIGS. 4A and 4B are block diagrams of hardware and software environments in which the disclosed systems and methods may operate, in accordance with one or more embodiments.
Figure 4B:
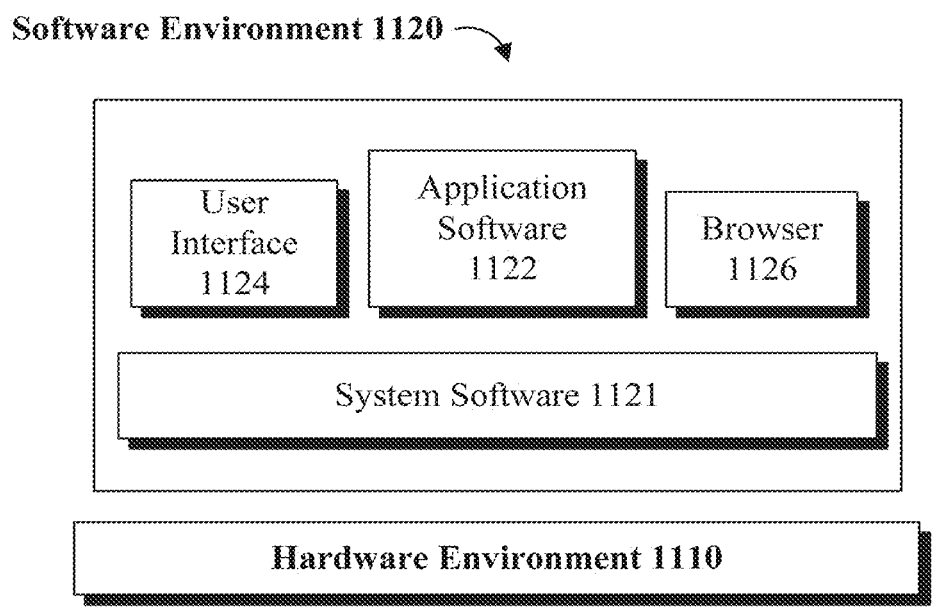

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method comprising:
   capturing a color image rendered on a display screen; and
   transforming the color image to binary color image, preserving textual graphic components and filtering out non-textual graphical components, said transforming comprises:
      representing a set having a component from continuous regions in the color image; and
      extracting the component as text component, wherein the component is recognized based on switches between runs where a single color part of the run comprises a lower number of pixels than all other single color parts of the run.

2. The method of claim 1, wherein the binary image is a gray scaled image.

3. The method of claim 1, wherein the binary image comprises black and white colors.

4. The method of claim 1, wherein said transforming comprises collecting horizontal sets of pixels in the continuous regions that contain two shades.

5. The method of claim 4, wherein the collected horizontal sets of pixels are combined into bi-level regions.

6. The method of claim 5, wherein pixels associated with a foreground color are distinguished from pixels from a background color, in response to determining that a bi-level region contains text.

7. An apparatus comprising a processor, wherein said processor is configured to perform the steps of:
   capturing a color image rendered on a display screen; and
   transforming the color image to binary color image, preserving textual graphic components and filtering out non-textual graphical components, said transforming comprises:
      representing a set having a component from continuous regions in the color image; and
      extracting the component as text component, wherein the component is recognized based on switches between runs where a single color part of the run comprises a lower number of pixels than all other single color parts of the run.

8. The apparatus of claim 7, wherein the binary image is a gray scaled image.

9. The apparatus of claim 7, wherein the binary image comprises black and white colors.

10. The apparatus of claim 7, wherein said transforming comprises collecting horizontal sets of pixels in the continuous regions that contain two shades.

11. The apparatus of claim 10, wherein the collected horizontal sets of pixels are combined into bi-level regions.

12. The apparatus of claim 11, wherein pixels associated with a foreground color are distinguished from pixels from a background color, in response to determining that a bi-level region contains text.

13. A computer program product comprising non-transitory computer readable medium retaining instructions, which instructions, when executed by a processor, are configured to cause the processor to perform the steps of:
   capturing a color image rendered on a display screen; and
   transforming the color image to binary color image, preserving textual graphic components and filtering out non-textual graphical components, said transforming comprises:
      representing a set having a component from continuous regions in the color image; and
      extracting the component as text component, wherein the component is recognized based on switches between runs where a single color part of the run comprises a lower number of pixels than all other single color parts of the run.

14. The computer program product of claim 13, wherein the binary image is a gray scaled image.

15. The computer program product of claim 13, wherein the binary image comprises black and white colors.

16. The computer program product of claim 13, wherein said transforming comprises collecting horizontal sets of pixels in the continuous regions that contain two shades.

17. The computer program product of claim 16, wherein the collected horizontal sets of pixels are combined into bi-level regions.

18. The computer program product of claim 17, wherein pixels associated with a foreground color are distinguished from pixels from a background color, in response to determining that a bi-level region contains text.

* * * * *